(12) United States Patent
Nattinger

(10) Patent No.: US 7,252,264 B2
(45) Date of Patent: Aug. 7, 2007

(54) FLYING SAILBOAT

(76) Inventor: John Ross Nattinger, 208 Ringwood Dr., Winter Springs, FL (US) 32708

( * ) Notice: Subject to any disclaimer, the term of this patent is extended or adjusted under 35 U.S.C. 154(b) by 95 days.

(21) Appl. No.: 11/258,474

(22) Filed: Oct. 25, 2005

(65) Prior Publication Data

US 2006/0163428 A1 Jul. 27, 2006

Related U.S. Application Data

(60) Provisional application No. 60/646,870, filed on Jan. 25, 2005.

(51) Int. Cl.
*B64C 35/00* (2006.01)

(52) U.S. Cl. .............. 244/2; 244/49; 244/106; 114/39.21

(58) Field of Classification Search .......... 244/2, 244/49, 101, 105, 106, 39, 46, 48; 114/39.21, 114/39.26, 61.1, 102.1, 292
See application file for complete search history.

(56) References Cited

U.S. PATENT DOCUMENTS

| | | | |
|---|---|---|---|
| 1,400,262 A | 12/1921 | Caproni | |
| 1,710,670 A | 4/1929 | Bonney | |
| 1,724,755 A | 8/1929 | Ferruzzi | |
| 1,834,858 A | 12/1931 | Metzler | |
| 1,945,254 A | 1/1934 | Bittner | |
| 2,255,046 A | 9/1941 | Diehl | |
| 2,444,332 A * | 6/1948 | Briggs et al. | 244/49 |
| 2,940,688 A * | 6/1960 | Bland | 244/2 |
| 3,165,280 A * | 1/1965 | Lee | 244/12.4 |
| 3,584,813 A | 6/1971 | Sweeney | |
| 3,599,903 A | 8/1971 | Handler | |
| 3,614,024 A | 10/1971 | Millman | |
| 3,800,724 A | 4/1974 | Tracy | |
| 3,899,146 A | 8/1975 | Armlck | |
| 3,911,845 A | 10/1975 | Holtom | |
| 3,987,982 A | 10/1976 | Amick | |
| 4,080,922 A * | 3/1978 | Brubaker | 114/282 |
| 4,478,164 A | 10/1984 | Menear | |
| 4,685,641 A * | 8/1987 | Kirsch et al. | 244/105 |
| 4,913,375 A * | 4/1990 | Fitzpatrick | 244/2 |
| 5,054,410 A * | 10/1991 | Scarborough | 114/39.26 |
| 5,181,674 A | 1/1993 | Apgar | |

(Continued)

*Primary Examiner*—Teri Pham Luu
*Assistant Examiner*—Joseph W Sanderson
(74) *Attorney, Agent, or Firm*—David G. Maire; Beusse Wolter Sanks Mora + Maire, P.A.

(57) ABSTRACT

A vehicle adapted for airborne flight and waterborne sailing has a fuselage (20) with left and right wings (52, 54) that pivot independently about a respective longitudinal axis from a generally horizontal orientation for flight to a generally vertical orientation to provide wind-driven propulsion for sailing. Further, the wings (52, 54) pivot about a respective second axis (66) that is generally perpendicular to the longitudinal axis to trim the wings (52, 54) for sailing with a given relative wind direction. The wings (52, 54) are mounted by a respective first pivotal joint (56, 58) to the distal ends of respective stub wing/decks (48, 50). The stub wing/decks form a fixed central wing section (46). Water hulls (28) are mounted below the distal ends of the stub wing/decks (48, 50) on vertical pylons (30) to provide stable flotation. Vertical and horizontal stabilizers (40, 60) are mounted on the back ends of the water hulls (28).

14 Claims, 6 Drawing Sheets

U.S. PATENT DOCUMENTS

| | | | |
|---|---|---|---|
| 6,105,524 A * | 8/2000 | Dane | 114/39.21 |
| 6,341,571 B1 * | 1/2002 | Russell et al. | 114/39.21 |
| 6,892,665 B2 | 5/2005 | Jesadanont et al. | |
| 6,997,413 B2 * | 2/2006 | Wukowitz | 244/106 |
| 7,063,291 B2 * | 6/2006 | Rado | 244/106 |

* cited by examiner

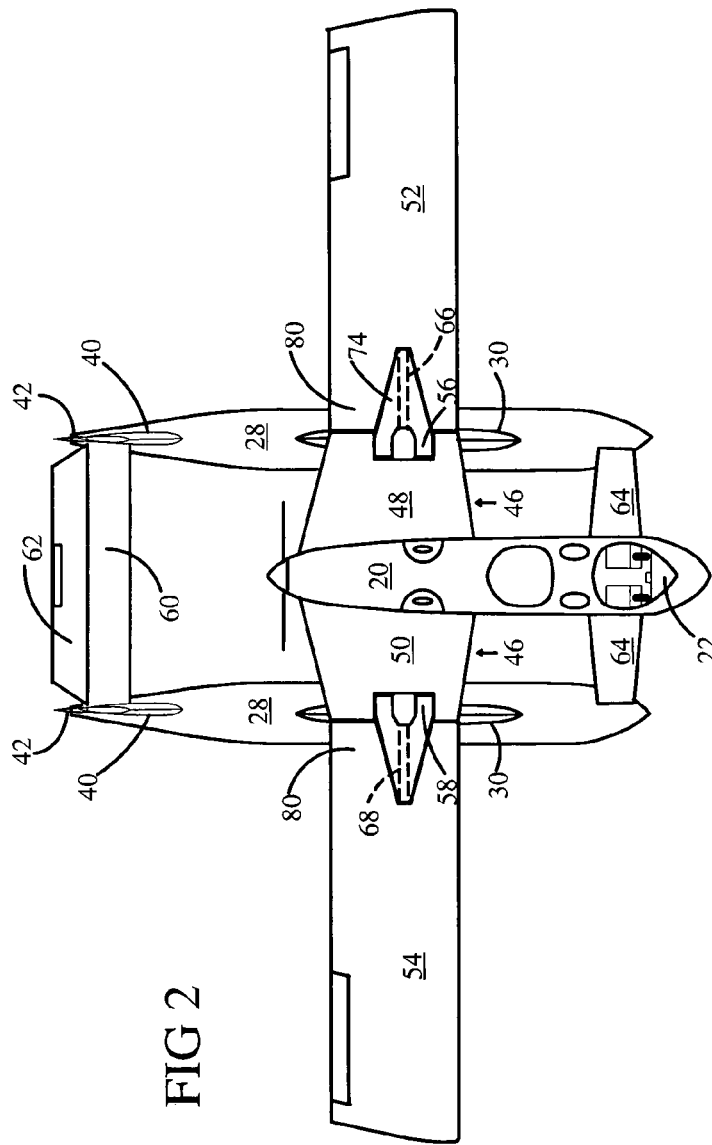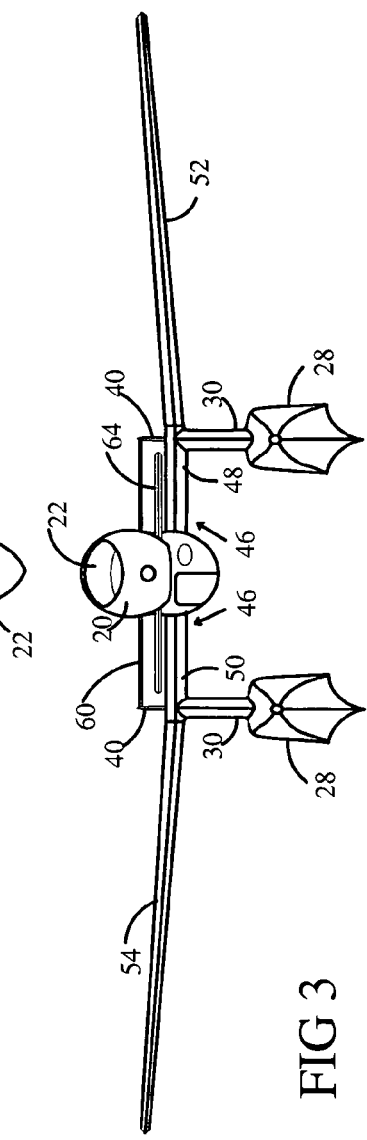
FIG 2
FIG 3

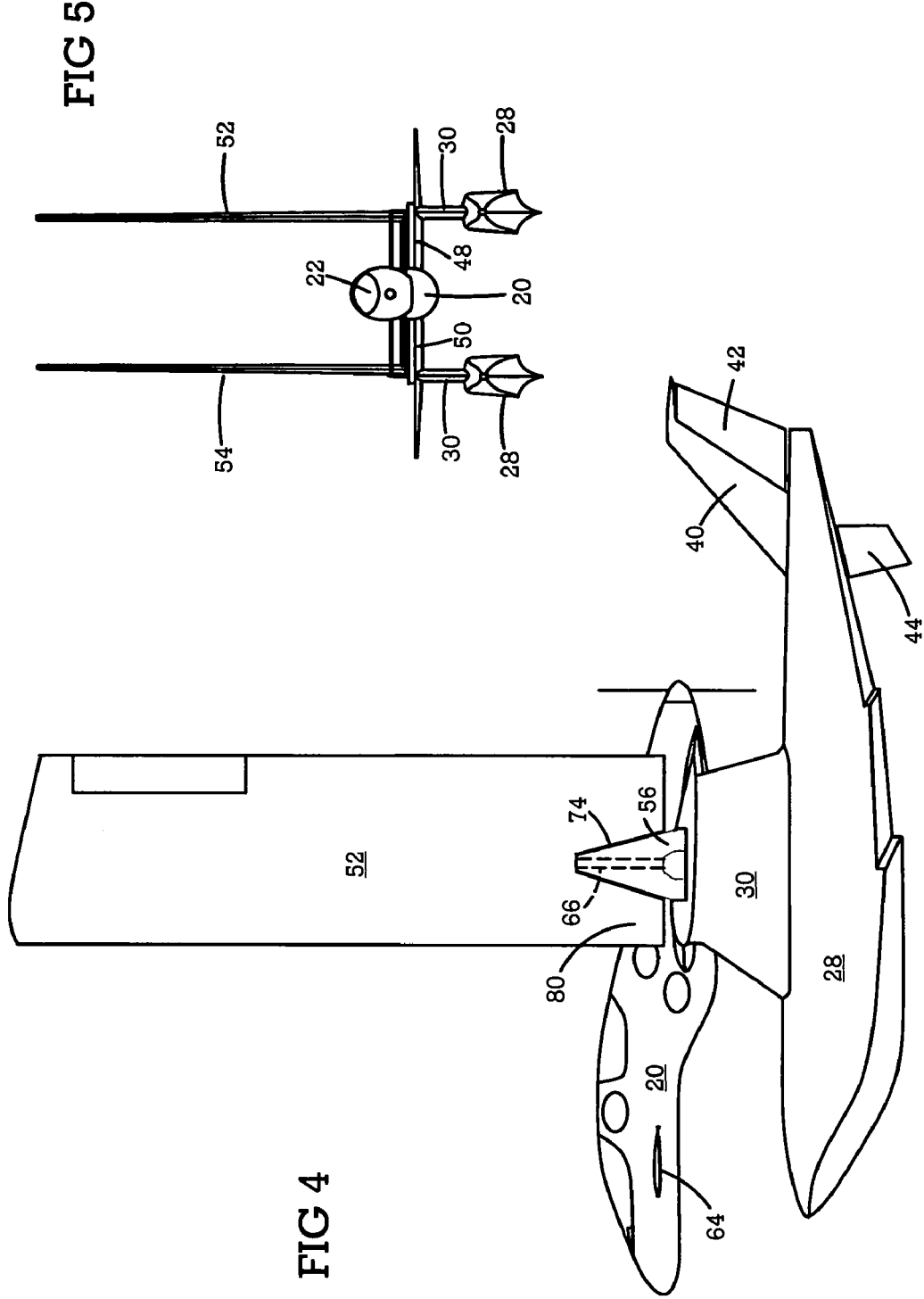

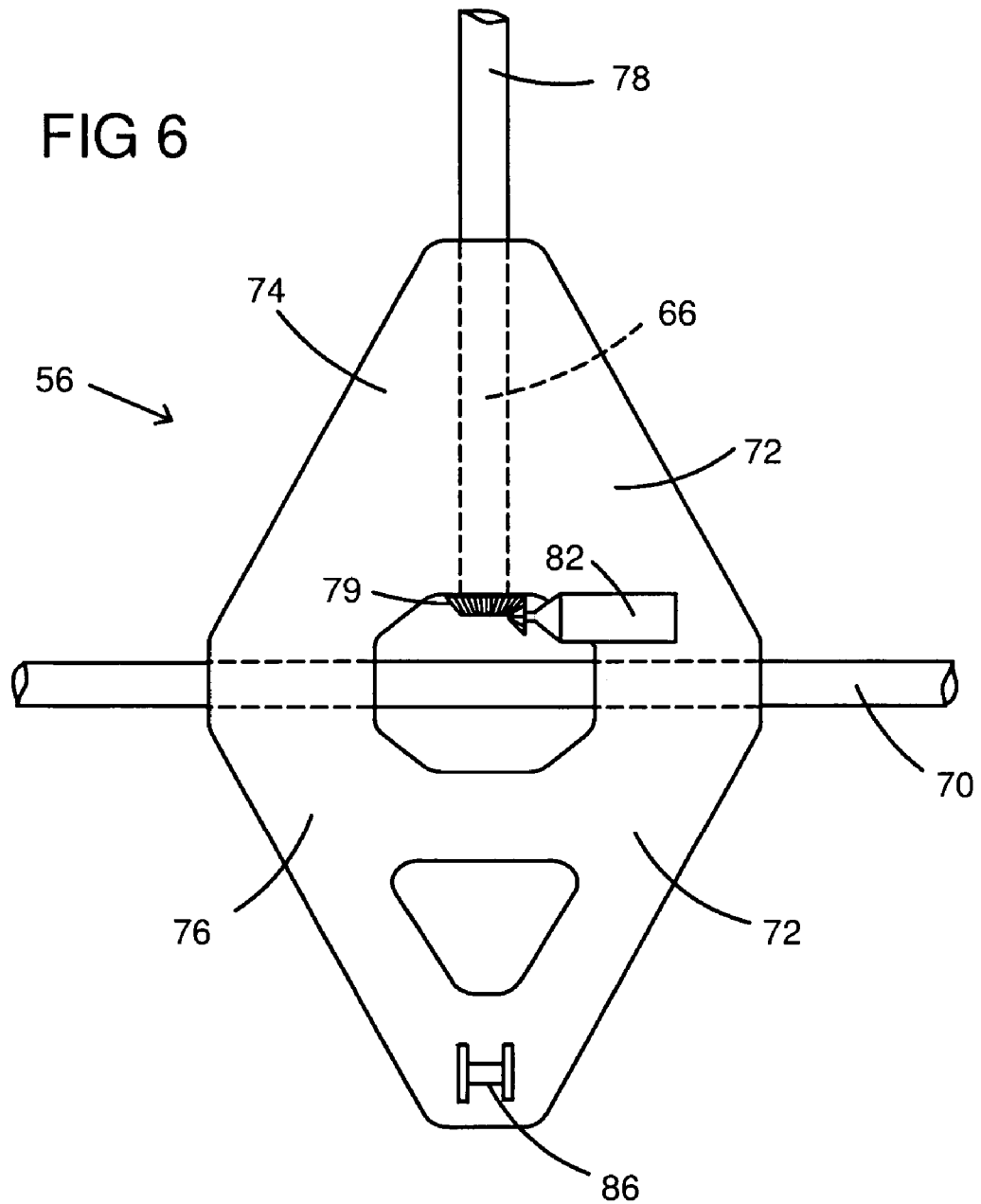

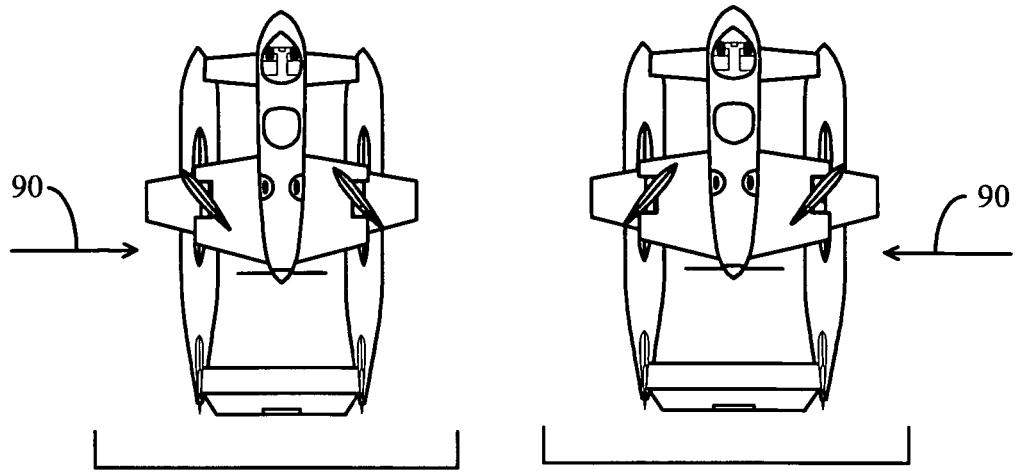
FIG 9  FIG 10
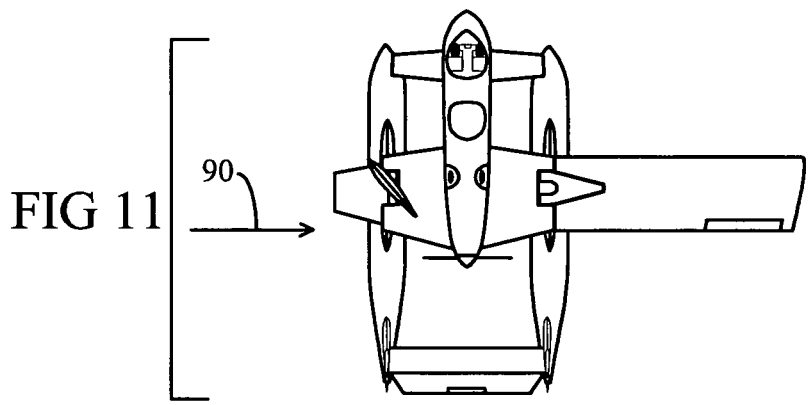
FIG 11
FIG 12
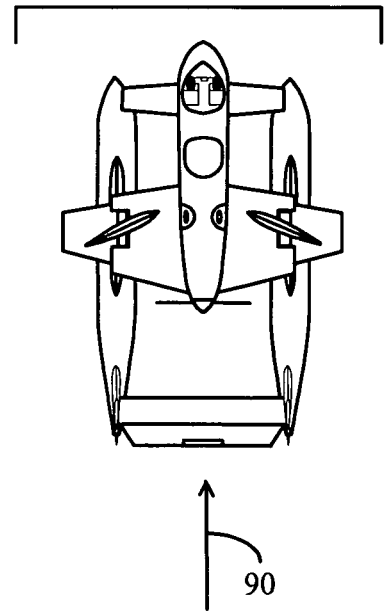

FLYING SAILBOAT

CROSS-REFERENCE TO RELATED APPLICATIONS

This application claims the benefit of U.S. provisional application 60/646,870, filed Jan. 25, 2005.

FIELD OF THE INVENTION

This invention relates generally to hybrid aircraft/watercraft, and especially to hybrid aircraft/sailcraft in which the aircraft wings pivot for use as watercraft sails.

BACKGROUND OF THE INVENTION

Aircraft that use water for runways and taxiways are well known. Some of these are originally designed as "flying boats" in which the fuselage is also a water hull. Some of these have retractable wheeled landing gear. Other aircraft have been designed or retrofitted with two pontoons for water operation. Air/water craft normally use the air propulsion engine for propulsion on water, and the air rudder for steering on water.

Some air/water craft have been designed for operation as sailcraft, using a wing as a sail. For example U.S. Pat. No. 5,181,674 (Apgar) shows an air/water craft with wings that pivot individually or in unison about an axis parallel to the longitudinal axis of the fuselage. A wing can be rotated to a generally vertical orientation to act as a sail. This craft has twin pontoons that pivot about a vertical axis to set a course for the sailcraft while orienting the sail wing as needed for propulsion in a given wind direction.

BRIEF DESCRIPTION OF THE DRAWINGS

The invention is explained in following description in view of the drawings that show:

FIG. 2 is a top view of FIG. 1.

FIG. 3 is a front view of FIG. 1.

FIG. 4 is a side view in a sailing configuration with at least one wing raised.

FIG. 5 is a front view in a sailing configuration with both wings raised.

FIG. 6 is a top view, when the wing is horizontal, of a first pivotal joint for pivoting the wing about a horizontal axis, and an attached second pivotal joint for pivoting the wing about a wing spar on an axis perpendicular to the horizontal axis.

FIG. 9 Schematic top view of flying sailboat in sailing mode on a port tack (wind coming from left) with both wings vertical.

FIG. 10 Schematic top view of flying sailboat in sailing mode on a starboard tack (wind coming from right) with both wings vertical.

FIG. 11 Schematic top view of flying sailboat in sailing mode on a port tack with the windward wing vertical and the leeward wing horizontal.

FIG. 12 Schematic top view of flying sailboat in sailing mode running with the wind.

DETAILED DESCRIPTION OF THE INVENTION

Figure 1:
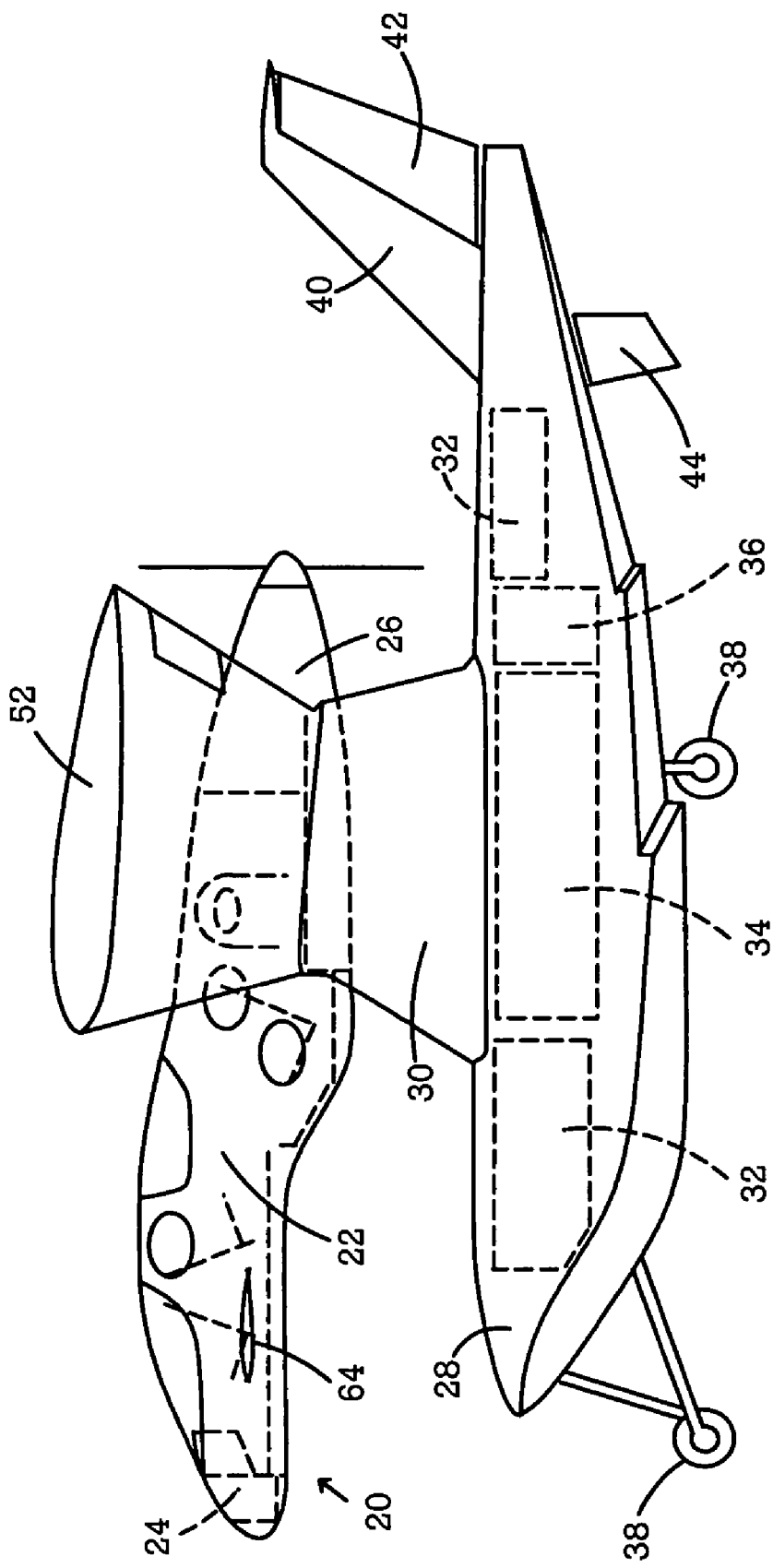
FIG. 1 is a side outline of a flying sailboat with an example layout in a flight configuration.

FIG. 1 shows a side outline of a flying sailboat in an example layout that may comprise a fuselage 20 with a cabin 22, avionics 24, and an engine 26. Two or more aerodynamic water hulls 28 may be mounted below the fuselage 20 on pylons 30 in a stable configuration for watercraft. These hulls 28 may include cargo bays 32, fuel bays 34, water storage bays 36 and the like. Amphibious landing gear 38 may be mounted on the hulls 28, and may be retractable. A vertical stabilizer 40 may be mounted on the back end of each hull 28, and may comprise an air rudder 42. A water rudder 44 may be mounted near the back end of each hull 28, and may be retractable. A retractable centerboard (not shown) may be provided in each hull 28 for sailing.

FIG. 2 is a top view showing a wing center section 46 fixed to the fuselage 20, forming a left stub wing/deck 48 and a right stub wing/deck 50. Left and right wings 52, 54 are attached to the distal ends of the respective stub wing/decks 48, 50 on first left and right pivotal joints 56, 58 that allow each wing 52, 54 to rotate about a longitudinal pivot axis from a generally horizontal position for flight to a generally vertical position as shown in FIGS. 4 and 5 for sailing. Herein a "longitudinal axis" is an axis that is generally parallel to the length of the fuselage. Movement of the wings between horizontal and vertical positions may be accomplished by mechanical, hydraulic or pneumatic mechanisms in various embodiments, with one such embodiment described more fully below. FIG. 2 shows a horizontal stabilizer 60 spanning between two vertical stabilizers 40. An elevator 62 may be mounted on the horizontal stabilizer 60. Canard airfoils 64 may be provided forward of the wings for enhanced flight stability and control as known in aeronautics.

Each wing 52, 54 is connected to the respective first pivotal joint 56, 58 by a respective second left and right pivotal joint 66, 68, allowing the wing to rotate about a second pivot axis that is generally perpendicular to the longitudinal pivot axis. This provides trim control of the craft during sailing. The second pivotal joints 66, 68 are controllable to trim the wings 52, 54 to an appropriate angle to the wind 90 for sailing in a given direction. Either the left wing 52, the right wing 54, or both wings 52, 54, may be raised to a vertical position for sailing, depending on wind conditions and desired sailing characteristics. Various trim configurations are shown in FIGS. 9-12.

The airfoil cross sections of the wings 52, 54 may be symmetrical about the airfoil chord, the chord being a straight line between the leading and trailing edge of the wing in the airfoil section. This allows the wing to operate symmetrically as a sail. The wing center section 46 need not have the same airfoil shape as the left and right wings 52, 54. Thus, the stub wing/decks 48, 50 may comprise asymmetric airfoils, while the left and right wings 52, 54 may comprise symmetric airfoils.

FIG. 6 shows first and second pivotal joints 56, 66 as seen in a top view when the wing is horizontal. The first pivotal joint 56 may comprise a first pivot axle 70 attached to the distal end of the stub wing/deck 48, and a plate 72 rotatably mounted on the first pivot axle 70. The plate 72 may comprise first and second lever arms 74, 76 extending on generally radially opposite sides of the pivot axle 70. The second pivotal joint 66 may comprise a spar 78 in the root 80 of the wing 52, the spar 78 rotatably mounted in the first lever arm 74, thereby defining the second pivot axis. The spar 78 may be an extension of the main wing spar in a wing constructed with such a spar. A control mechanism for the second pivotal joint 66 may comprise a reversible motor 82 mounted on the first lever arm 74 and engaging the spar 78 with bevel gears 79. Other means for controlled orientation of the wing 52 about the second pivot axis may be envisioned in other embodiments, such as other mechanical mechanisms or a hydraulic or pneumatic mechanism.

Figure 7:
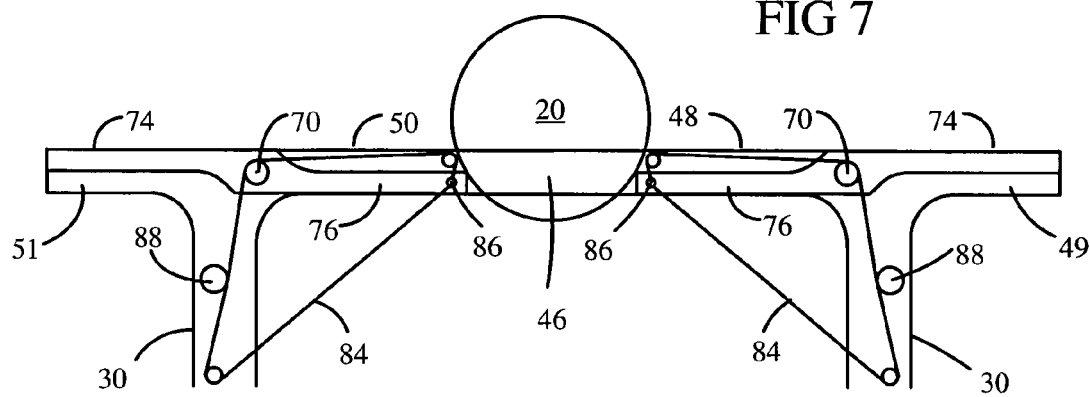
FIG. 7 is a front schematic view of the left and right first pivotal joints and controlling cables when the wings are horizontal.
Figure 8:
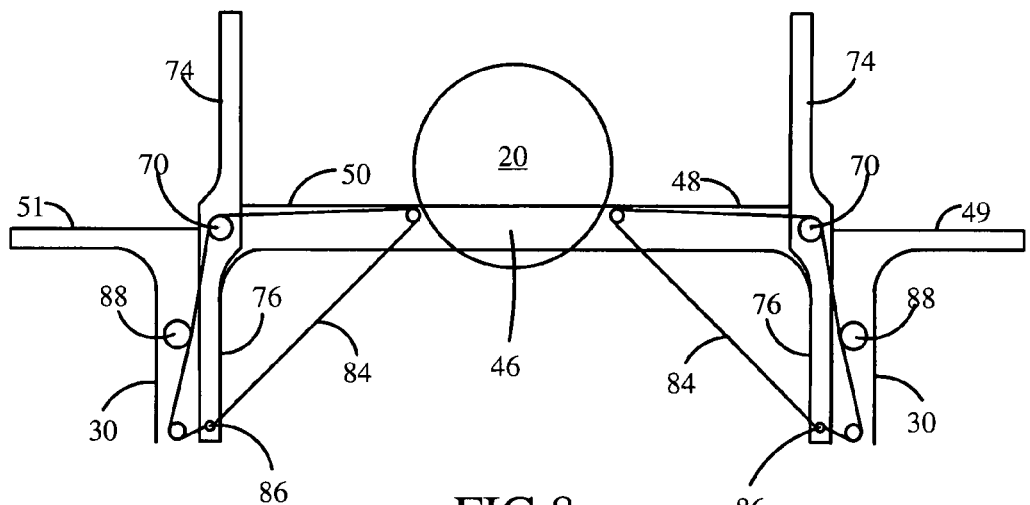
FIG. 8 is a view of FIG. 7 when wings are vertical.

FIGS. 7 and 8 show a control mechanism for the first pivotal joint 56 comprising a cable 84 attached 86 to the second lever arm 76 and to a winch mechanism 88 for pivoting the second lever arm 76 to a controlled position about the first pivot axis. This pivots the wing in a generally vertical plane. Cable tension is needed in two directions for this control—one for raising the wing 52, and one for lowering it. These tensions may operate in coordinated complementary opposition. For example, this can be done with an effectively continuous loop of cable 84 comprising first and second ends wound in opposite directions on respective first and second spools on a single winch power shaft. An intermediate point on the cable loop is fixed 86 to the second lever arm 76. Each spool may be independently rotationally adjustable on a power shaft to apply a tension preload on both ends of the cable. Alternately, two separate cables and/or two separate winches may be used to provide the two tension directions.

A latch (not shown) may operate to lock the second lever arm 76 in the horizontal position, so that cantilever stress of the wing 52, 54 during flight is not opposed by the control cables 84 alone. A second latch (not shown) may operate to lock the first lever arm 74 against left and right outriggers 49, 51 of the stub wing/deck 48, 50 in the horizontal position. If both latches are provided, the respective first pivot axle 70 is relieved of wing cantilever stress, and the leverage of the wing over the first pivotal joint 56, 58 is halved.

Although other configurations of fuselage, engine, wings, flotation, stability, and control surface elements are possible, the example configuration as shown has advantages. The stub wing/decks 48, 50 can serve as platforms for fishing, swimming, etc. when the wings are vertical. With the wings vertical, they are out of the way for docking, which can be accomplished by positioning a dock between the hulls to allow for loading of compartments and tanks in the fuselage and both water hulls 28 simultaneously. The twin water hull 28 configuration has rigidity, because the water hulls 28 are connected at the back by the horizontal stabilizer 60. A rear-mounted engine reduces spraying of water on the cockpit during powered water operations of taxiing, take-offs, and landings.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A vehicle adapted for airborne flight and waterborne sailing, the vehicle comprising:
   a fuselage comprising a roll axis;
   a left wing and a right wing;
   each wing connected to the fuselage by a respective first pivotal joint allowing the wing to rotate about a first pivot axis generally parallel to the roll axis from a generally horizontal wing position for providing lift during flight of the vehicle to a generally vertical wing position for providing wind-driven propulsion during sailing of the vehicle;
   each wing connected to the first pivotal joint by a second pivotal joint allowing the wing to rotate about a second pivot axis that is generally perpendicular to the first pivot axis for trim control of the wing during sailing; and
   a flotation hull attached to the fuselage;
   wherein the first pivotal joint comprises a first pivot axle attached to the fuselage and a plate rotatably mounted on the first pivot axle, the plate comprising first and second lever arms extending in two directions from the pivot axle, the second pivotal joint attached to the first lever arm, and the wing attached to the second pivotal joint.

2. A vehicle as in claim 1, further comprising a first control mechanism for raising and lowering its respective wing between the generally horizontal and generally vertical positions and a second control mechanism for turning the respective wing about the second pivot axis.

3. A vehicle as in claim 2, wherein the first control mechanism comprises a bidirectional cable loop attached to the second lever arm and operationally attached to a winch mechanism for pivoting the second lever arm and the respective wing to a controlled position about the first pivot axle.

4. A vehicle as in claim 3 wherein the second pivotal joint comprises a main spar of the respective wing rotatably mounted in the first lever arm along the second pivot axis, and the second control mechanism comprises a reversible motor mounted on the first lever arm and engaging the main spar for controlled rotational positioning of the main spar about the second pivot axis.

5. A vehicle as in claim 4, wherein the first and second lever arms extend on generally opposite sides of the first pivot axle, and further comprising:
   a wing center section attached to the fuselage between the two wings, the wing center section comprising left and right stub wings, each wing attached to a distal end of the respective stub wing by means of the respective first pivotal joint;
   the flotation hull comprising a left flotation hull and a right flotation hull, each of the left and right flotation hull attached below the distal end of the respective stub wing on a generally vertical pylon; and
   a retractable water rudder on each of the left and right flotation hull.

6. A vehicle as in claim 5, wherein each wing comprises an airfoil that is substantially symmetrical about its chord.

7. A vehicle as in claim 6, further comprising a vertical stabilizer on each flotation hull, an air rudder on each vertical stabilizer, a horizontal stabilizer spanning between the two vertical stabilizers, and an elevator on the horizontal stabilizer.

8. A vehicle as in claim 7, further comprising left and right canard airfoils extending from the fuselage forward of the wing center section.

9. A vehicle as in claim 8, further comprising amphibious wheeled landing gear on each flotation hull.

10. A vehicle adapted for airborne flight and waterborne sailing, the vehicle comprising:
    a fuselage;
    a left wing and a right wing;
    a wing center section attached to the fuselage between the two wings, the wing center section comprising left and right stub wings, each wing connected to a distal end of the respective stub wing by a first pivotal joint, allowing the wing to rotate about a longitudinal axis from a generally horizontal wing position for providing lift during flight of the vehicle to a generally vertical wing position for providing propulsion during sailing of the vehicle;

the first pivotal joint comprising a first pivot axle attached to the stub wing, a plate rotatably mounted on the first pivot axle, the plate comprising first and second lever arms extending on generally radially opposite sides of the pivot axle;

each wing connected to the respective first pivotal joint by a second pivotal joint, allowing the wing to rotate about a second pivot axis that is generally perpendicular to the first pivot axis for trim control of the vehicle during sailing;

a first control mechanism comprising a cable attached to the second lever arm and to a winch mechanism for pivoting the second lever arm and its respective wing to a controlled position about the first pivot axle;

the second pivotal joint comprising a spar extending from the root of the respective wing rotatably mounted in the first lever arm along the second pivot axis; a second control mechanism comprising a reversible motor mounted on the first lever arm and engaging the spar for controlled rotational positioning of the respective wing about the second pivot axis; and left and right flotation hulls, each flotation hull attached below the distal end of the respective stub wing on a generally vertical pylon.

11. A vehicle as in claim 10, wherein each wing comprises an airfoil that is substantially symmetrical about its chord.

12. A vehicle as in claim 10, further comprising a vertical stabilizer on each flotation hull, an air rudder on each vertical stabilizer, a horizontal stabilizer spanning between the two vertical stabilizers, an elevator on the horizontal stabilizer, and a retractable water rudder on each flotation hull.

13. A vehicle as in claim 10, further comprising left and right canard airfoils extending from the fuselage forward of the wing center section.

14. A vehicle as in claim 11, further comprising amphibious wheeled landing gear on each flotation hull.

* * * * *